(12) United States Patent
Nakhamkin

(10) Patent No.: US 7,640,643 B2
(45) Date of Patent: Jan. 5, 2010

(54) CONVERSION OF COMBINED CYCLE POWER PLANT TO COMPRESSED AIR ENERGY STORAGE POWER PLANT

(76) Inventor: Michael Nakhamkin, 40 Woodman La., Basking Ridge, NJ (US) 07920

( * ) Notice: Subject to any disclaimer, the term of this patent is extended or adjusted under 35 U.S.C. 154(b) by 0 days.

(21) Appl. No.: 12/320,751

(22) Filed: Feb. 4, 2009

(65) Prior Publication Data

US 2009/0145103 A1    Jun. 11, 2009

Related U.S. Application Data

(60) Continuation-in-part of application No. 12/285,404, filed on Oct. 3, 2008, now Pat. No. 7,614,237, which is a continuation-in-part of application No. 12/216,911, filed on Jul. 11, 2008, now abandoned, which is a continuation of application No. 12/076,689, filed on Mar. 21, 2008, now Pat. No. 7,406,828, which is a division of application No. 11/657,661, filed on Jan. 25, 2007, now abandoned.

(51) Int. Cl.
*F02C 6/18* (2006.01)
*F02C 7/00* (2006.01)

(52) U.S. Cl. .................... 29/401.01; 60/727
(58) Field of Classification Search ................ 29/401.1; 60/39.182, 39.183, 39.511, 727, 772, 801
See application file for complete search history.

(56) References Cited

U.S. PATENT DOCUMENTS 3,631,673 A    1/1972    Charrier et al.
4,885,912 A    12/1989    Nakhamkin
5,442,904 A    8/1995    Shnaid
5,537,822 A    7/1996    Shnaid et al.

(Continued)

FOREIGN PATENT DOCUMENTS

DE    102004040890 A1    3/2005

(Continued)

OTHER PUBLICATIONS

PCT Search Report and Written Opinion in PCT/US2009/048082, dated Aug. 17, 2009.

(Continued)

*Primary Examiner*—Louis J Casaregola
(74) *Attorney, Agent, or Firm*—Manelli Denison & Selter pllc; Edward J. Stemberger

(57) ABSTRACT

An apparatus and method converts a power generation combined cycle (CC) power plant to a load management compressed air energy storage (CAES) power plant. The CC power plant includes at least one combustion turbine, a heat recovery steam generator (HRSG) to receive exhaust heat from an associated combustion turbine, a steam turbine associated with the HRSG, and an electric generator associated with the steam turbine. An air storage stores compressed air. At least one compressor supplies the air storage with compressed air so that off peak energy can be converted to compressed air energy stored in the air storage. Compressed air from the storage is received by the HRSG and the HRSG provides heat to compressed air received from the air storage. The steam turbine receives heated compressed air from the HRSG and expands the heated compressed air to produce power.

7 Claims, 1 Drawing Sheet

U.S. PATENT DOCUMENTS

| | | |
|---|---|---|
| 5,632,143 A | 5/1997 | Fisher et al. |
| 5,660,037 A * | 8/1997 | Termuehlen ................. 60/783 |
| 5,778,675 A | 7/1998 | Nakhamkin |
| 5,934,063 A | 8/1999 | Nakhamkin |
| 6,244,037 B1 | 6/2001 | Nakhamkin et al. |
| 6,260,269 B1 * | 7/2001 | Turnquist et al. .......... 29/889.1 |
| 6,305,158 B1 | 10/2001 | Nakhamkin |
| 6,745,569 B2 | 6/2004 | Gerdes |
| 6,851,265 B2 | 2/2005 | Elwood et al. |
| 7,389,644 B1 | 6/2008 | Nakhamkin |
| 2003/0131599 A1 | 7/2003 | Gerdes |
| 2005/0268594 A1 | 12/2005 | Kurihara |

FOREIGN PATENT DOCUMENTS

| | | |
|---|---|---|
| RU | 2029119 C1 | 2/1995 |
| SU | 383859 A | 7/1973 |
| WO | WO 92/22741 A1 | 12/1992 |

OTHER PUBLICATIONS

Eurasian search report dated Sep. 11, 2007 in corresponding parent application.

* cited by examiner

CONVERSION OF COMBINED CYCLE POWER PLANT TO COMPRESSED AIR ENERGY STORAGE POWER PLANT

This application is a continuation-in-part of U.S. application Ser. No. 12/285,404, filed on Oct. 3, 2008 now U.S. Pat. No. 7,614,237, which is a continuation-in-part of U.S. application Ser. No. 12/216,911 filed on Jul. 11, 2008 now abandoned which is a continuation of U.S. application Ser. No. 12/076,689, filed on Mar. 21, 2008, now U.S. Pat. No. 7,406,828, which is a division of U.S. application Ser. No. 11/657,661, filed on Jan. 25, 2007, now abandoned.

FIELD

The embodiments relate to compressed air energy storage (CAES) power plants and, more particularly, to the conversion of a power producing combined cycle (CC) power plant to a load management CAES power plant.

BACKGROUND

U.S. Pat. No. 7,389,644 and No. 7,406,828 disclose CAES plant concepts with a power generation section including a combustion turbine as a prime power generation component, with a recuperator recovering the combustion turbine exhaust heat to preheat stored compressed air, withdrawn from a storage, to be expanded through a bottoming cycle expander driving an electric generator that generates the bottoming cycle additional power with additional power being generated by the air injection into combustion turbine assembly with associated power augmentation of combustion turbine. These CAES plants could be built based on existing combustion turbines.

There is significant conceptual similarity between the disclosed CAES plant concepts and CC power plants that include a combustion turbine with Heat Recovery Steam generator (HRSG) recovering the combustion turbine exhaust heat for steam generation to be expanded through the bottoming cycle power generating steam turbine.

When using renewable energy resources like wind and solar power that are not controllable, there is a need for CAES plants to store the renewable energy during off-peak hours when it is not needed and to release it when it is needed during peak hours.

There is a need to convert existing CC power plants to CAES power plants into load management CAES plants to significantly reduce cost and improve economics of CAES plants that are needed to load manage and enhance economics of renewable resources.

SUMMARY

An object of the present invention is to fulfill the needs referred to above. In accordance with the principles of an embodiment, this objective is obtained by a method of converting a CC power plant to CAES power plant. The CC power plant includes at least one combustion turbine, a HRSG constructed and arranged to receive exhaust heat from an associated combustion turbine for steam generation to be expanded through the bottoming cycle power generating a steam turbine associated with the HRSG, and an electric generator associated with the steam turbine. The method provides additional external components needed for the conversion in a CAES plant. Thus, an air storage is provided to store compressed air. At least one motor-driven compressor is constructed and arranged to supply, during off-peak hours, the compressed air into the air storage. The method ensures that compressed air from the storage can be received by the HRSG with corresponding parameters. The HRSG provides heat to compressed air received from the air storage. The steam turbine receives heated compressed air from the HRSG to expand the heated compressed air to atmospheric pressure to produce power. An electric generator is associated with the steam turbine. Also, a portion of airflow expanded by the steam turbine can be injected, under certain conditions, into the combustion turbine assembly for additional power due to the power augmentation of the combustion turbine. The HRSG and the steam turbine can be used as is, but are preferably modified, with heat transfer components being added to the HRSG for enhancing the compressed air preheating, and the steam turbine being converted to an air expander.

In accordance with another aspect of an embodiment of converting a CC power plant to CAES power plant, a CAES power plant includes at least one combustion turbine. A HRSG is constructed and arranged to receive exhaust heat from an associated combustion turbine. The HRSG is used as is or is modified to be able to provide heat to compressed air. A steam turbine is associated with the HRSG. The steam turbine is used as is or is modified to be able to expand heated compressed air to atmospheric pressure to produce power. An electric generator is associated with the steam turbine. Also, a portion of airflow expanded by the steam turbine can be injected, under certain conditions, into the combustion turbine assembly for additional power due to the power augmentation of the combustion turbine.

Additional external components are needed for the conversion in a CAES plant. An air storage is constructed and arranged to store compressed air. The HRSG is associated with the air storage to receive compressed air from the air storage. At least one compressor is constructed and arranged to supply during off-peak hours the compressed air into air storage. The air storage is constructed to ensure that compressed air from the storage can be received by the HRSG with corresponding parameters.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWING

The invention will be better understood from the following detailed description of the preferred embodiments thereof, taken in conjunction with the accompanying drawing, wherein like reference numerals refer to like parts, in which.

DETAILED DESCRIPTION OF AN EXAMPLE EMBODIMENT

Figure 1:
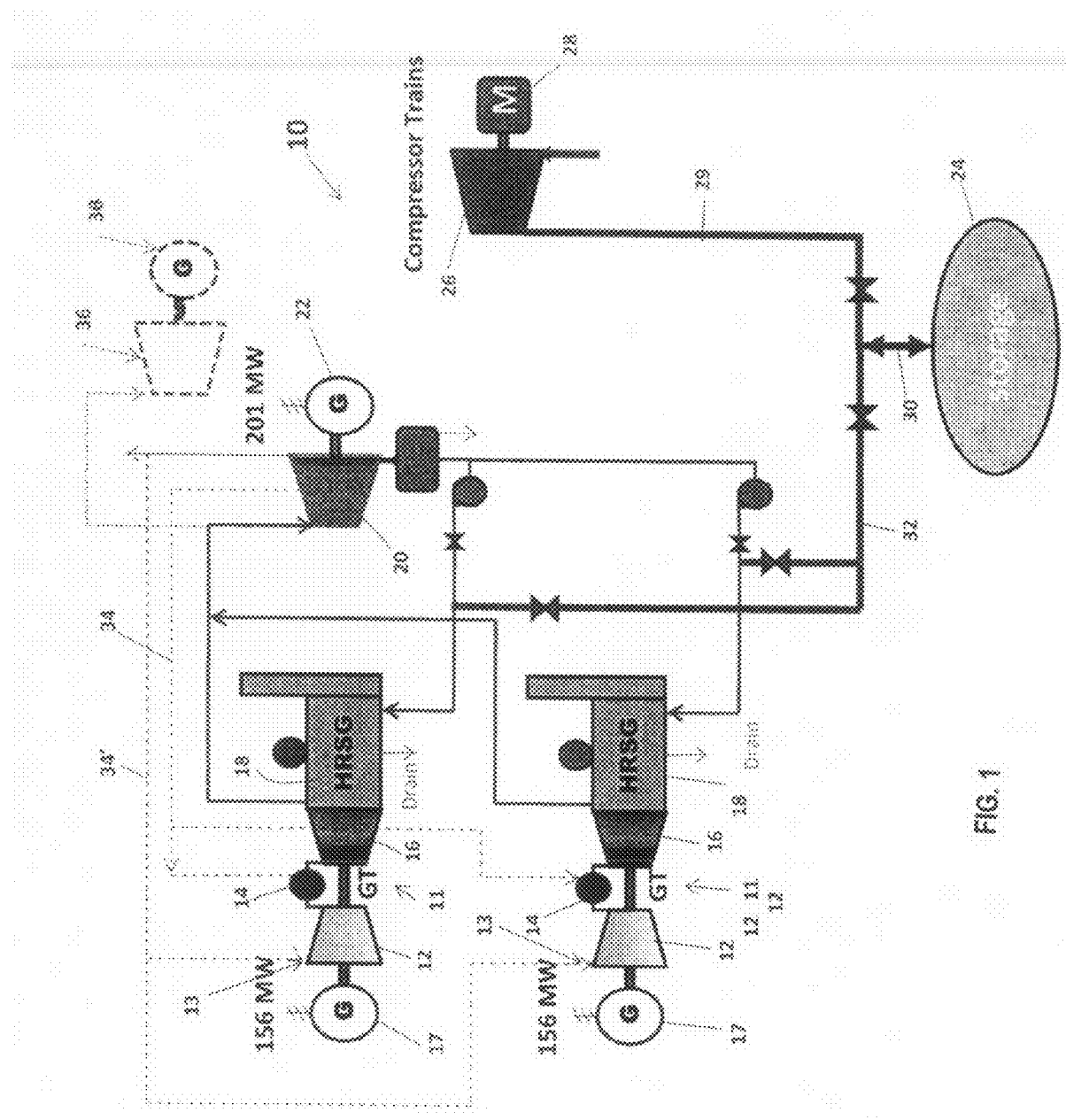
FIG. 1 is a schematic illustration of the conversion of a CC power plant (with typical combined cycle configuration based on two combustion turbines with HRSGs feeding the steam into the single bottoming cycle steam turbine) into a CAES power plant in accordance with an embodiment of the invention.

The embodiment converts a CC power plant to a CAES power plant. The only additional components typical for a CAES plants that need to be added to CC power plants (converted to CAES plants) are external compressor(s) and an air storage such that the external compressor(s) will utilize off peak energy to convert it to the compressed air energy stored in the air storage.

In the CC plant converted to CAES plant, stored compressed air, extracted from the storage, is preheated in an existing or properly modified HRSG and is expanded in an existing or properly modified steam turbine. This conversion of a power generation CC power plant into the load management CAES plant provides significant costs savings due to the adaptation of combustion turbines and the bottoming cycle components.

Thus, in accordance with an embodiment and with reference to FIG. 1, a CC power plant is converted to a CAES power plant, generally indicated at 10. The plant 10 includes at least one conventional combustion (e.g., gas) turbine (GT), generally indicated at 11, having a main compressor 12; receiving, at inlet 13, a source of inlet air at ambient temperature and feeding a main fuel burning combustor 14 with the compressed air for preheating; a main expansion turbine 14 operatively associated with the main compressor 12, with the combustor 14 feeding the main expansion turbine 16; and an electric generator 17 for generating electric power.

Each heat recovery steam generator (HRSG) 18 is associated with each GT. More particularly, each HRSG 18 receives exhaust gas heat from the associated turbine 14. Since the HRSG 18 is a heat exchanger, it can be used as is or can be modified for stored compressed air preheating. In accordance with the embodiment, minor modifications of the HRSG 18 could be made to deliver compressed air preheating by adding heat transfer components to the HRSG 18. Alternatively, significant modifications/optimization of the HRSG 18 can be made by converting the HRSG 18 to define a recuperator optimized for the best and most efficient heat recovery. The approach for the HRSG modification is driven by economics and CAES plant operating requirements.

The plant 10 also includes a steam turbine 20 that receives heated compressed air from each HRSG 18. An electric generator 22 is associated with the turbine 20 for producing electric power. The steam turbine 20 is used as is or is modified by converting it into an air expander based on properly optimized inlet compressed air mass flow and temperature parameters and exhaust to the atmospheric pressure without significant modification of steam turbine flow path. This type of conversion is typical and practical and there are a number of conventional steam turbines converted into air/gas expanders.

Thus, in accordance with the embodiment, a method of converting a CC power plant to CAES power plant provides an air storage 24 constructed and arranged to store compressed air. At least one compressor 26, driven by a motor 28, is provided to supply the air storage 24 with compressed air via piping 29. An outlet 30 of the air storage 24 is connected by piping 32 to each HRSG 18 so that compressed air can be received by each HRSG 18. Each HRSG 18 is used as is or modified, as noted above, to be able to provide heat to the compressed air received from the air storage. The steam turbine 20 is used as is or is modified, as noted above, to be able to receive heated compressed air from each HRSG 18 and to expand the heated compressed air to produce power.

The airflow extracted from the steam turbine 20 is injected into the combustion turbine assembly 11, preferably upstream of combustors 16 with injection flow parameters determined by combustion turbine limitations and optimization. As shown in FIG. 1, structure 34 facilitates the injection of air into combustion turbine assembly. In the embodiment, the structure 34 is preferably piping structures. Injection can be limited or restricted under certain conditions. For example, based on combustion turbine manufacturers published data, injection at low ambient temperatures may not be permitted or possible, or injection may not be permitted or possible due to accessibility to injection points, or injection may not occur due to operational judgments. The extracted airflow injected into the combustion turbine assembly 11 upstream of the combustors 14 provides a combustion turbine power augmentation of approximately up to 20-25%. The remaining airflow in the steam turbine 20 is expanded though low pressure stages to atmospheric pressure. Thus, when injection is possible or desired, not all airflow from the steam turbine 20 is exhausted to atmospheric pressure.

Alternatively, since the steam turbine 20 reduces the pressure of the preheated compressed air, the temperature of the compressed air is reduced. Thus, cold (lower than ambient temperature) air from the steam turbine 20 can be connected via structure 34' with the ambient air at main compressor inlet 13 so that ambient inlet air and the colder expander exhaust air are mixed, reducing the overall temperature of the inlet air prior to being received by the main compressor 12. The reduction of the overall temperature of the inlet air prior to being received by the main compressor 12 provides a combustion turbine power augmentation of approximately up to 20-25%. In the embodiment, the structure 34' is piping connected between an exhaust stage of the steam turbine 20 and the inlet 13 to the main compressor 12, which is an alternative to piping 34.

In the converted combined cycle to CAES power plant 10 of FIG. 1, preferably during peak hours, stored compressed air is extracted from the air storage 24, is sent to each existing or modified HRSG and is preheated therein. The heated compressed air is then expanded in the existing or modified steam turbine 20 to produce power. The power can be converted to electrical power by the generator 22. The airflow extracted from the steam turbine can be injected into the combustion turbine assembly 11 upstream of the combustors 14 to provide a combustion turbine power augmentation of approximately up to 20-25%. Alternatively, cold (lower than ambient temperature) air from the steam turbine 20 can be connected via structure 34' with the ambient air at main compressor inlet 13 so that the reduction of the overall temperature of the inlet air prior to being received by the main compressor 12 provides a combustion turbine power augmentation of approximately up to 20-25%.

The conversion of a combined cycle plant to the CAES plant 10 results in a significant costs savings due to adaptation of combustion turbine and the bottoming cycle components in the CAES plant 10.

There are opportunities for the optimization of the conversion of the combined cycle power plant into the CAES plant 10. For example, the bottoming cycle power of the conventional combined cycle plant is approximately 50-60% of the GT power. In an optimized CAES plant, the bottoming cycle power is approximately 150-200% of the GT power. Therefore, in an optimized CAES plant 10, in addition to the modified steam turbine 20, an additional bottom cycle expander 36, as shown in dotted form in FIG. 1, may be needed. The expander 36 also receives heated compressed air from the HRSG 18. A generator 38 can be associated with the expander 36 to produce electric power. In an optimized CAES plant 10, the modification of the HRSG into a recuperator may require additional heat recovery heat exchanger surfaces and/or an additional parallel heat exchanger (not shown).

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A method of converting a combined cycle power plant to a compressed air energy storage power plant, the combined cycle power plant including at least one combustion turbine, a heat recovery steam generator (HRSG) constructed and arranged to receive exhaust heat from an associated combustion turbine, a steam turbine associated with the HRSG, and an electric generator associated with the steam turbine, the method comprising the steps of:
   providing an air storage constructed and arranged to store compressed air,
   providing at least one compressor constructed and arranged to supply the air storage with compressed air,
   ensuring that compressed air from the storage can be received by the HRSG,
   utilizing the HRSG to provide heat to compressed air received from the air storage, and
   utilizing the steam turbine to receive heated compressed air from the HRSG and to expand the heated compressed air to produce power.

2. The method of claim 1, further comprising:
   permitting a portion of airflow expanded by the steam turbine to be extracted and injected, under certain conditions, into the combustion turbine assembly for power augmentation.

3. The method of claim 1, wherein prior to the step of utilizing the HRSG, the method includes modifying the HRSG by adding heat transfer components to the HRSG for enhancing the compressed air preheating.

4. The method of claim 1, wherein prior to the step of utilizing the HRSG, the method includes modifying the HRSG by converting the HRSG to an optimized recuperator.

5. The method of claim 1, wherein prior to the step of utilizing the steam turbine, the method includes modifying the steam turbine by converting the steam turbine to an air expander based on inlet compressed air mass flow and temperature parameters and exhaust atmospheric pressure.

6. The method of claim 1, wherein a number of combustion turbines are provided and a HRSG is associated with each combustion turbine, the method including utilizing each HRSG to heat compressed air received from the air storage, with each HRSG being constructed and arranged to deliver heated compressed air to the steam turbine.

7. The method of claim 1, further providing an additional bottom cycle expander receiving heated compressed air from the HRSG.

* * * * *